(No Model.)
J. L. STILLMAN.
NON CONDUCTING COVERING.
No. 427,928. Patented May 13, 1890.
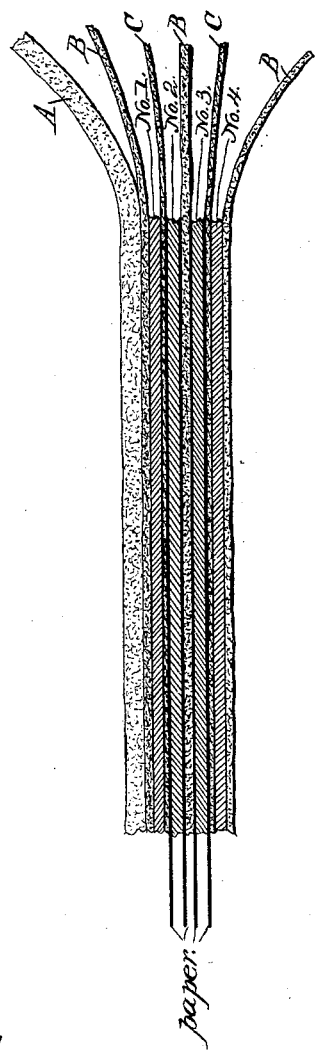
WITNESSES:
Fred G. Dieterich
Edw. W. Byrn.
INVENTOR:
Joseph L. Stillman
BY
ATTORNEYS

UNITED STATES PATENT OFFICE.

JOSEPH L. STILLMAN, OF FRESNO, CALIFORNIA.

NON-CONDUCTING COVERING.

SPECIFICATION forming part of Letters Patent No. 427,928, dated May 13, 1890.

Application filed November 13, 1889. Serial No. 330,141. (No model.)

*To all whom it may concern:*

Be it known that I, JOSEPH L. STILLMAN, of Fresno, in the county of Fresno and State of California, have invented a new and useful Improvement in Non-Conducting Coverings, of which the following is a specification.

The object of my invention is to provide a non-conducting covering for wrapping pipes, &c., to prevent freezing or loss of heat, and for all purposes of preventing the conduction or transmission of heat; and it consists in a covering composed of felt, red flannel, Osnaburg cloth, and paper, arranged in layers, with a special composition incorporated between the layers, as hereinafter fully described.

The drawing is a longitudinal section of a portion of the covering.

A is the layer of felt, B the red flannel, and C the Osnaburg cloth, and 1 2 3 4 are the four layers of composition between the layers of fabric. The layers are prepared and connected as follows: The red flannel is first saturated with castor-oil. I then take beeswax, English rosin, and beef-tallow and mix them together to a consistency that can be rolled into a sheet, which I prefer to make about one-fourth of an inch thick in the center and one-eighth of an inch upon the sides. This forms composition No. 1, which is placed between the layer of red flannel and Osnaburg cloth. I then prepare composition No. 2 with beeswax, English rosin, beef-tallow, pulverized charcoal, coal-tar, soap, and glycerine, with a sheet of paper on each side of it. This layer of composition is made a little thicker than the other, being preferably about one-half of an inch thick in the center and one-fourth of an inch at the sides. This layer of composition 2 is laid between Osnaburg cloth and the red flannel. I then prepare a layer of composition No. 3, of beeswax, English rosin, beef-tallow, ground charcoal, glycerine, salt, soap, and coal-tar, with paper on each side, which is laid between a layer of red flannel and Osnaburg cloth. I then prepare a layer of composition No. 4, of English rosin, beeswax, beef-tallow, ground charcoal, soap, and Cayenne pepper, and place it between Osnaburg cloth and red flannel, the Cayenne pepper being to keep rats and mice from chewing the material.

The thickness of the covering may be varied to suit different requirements, and the layers of composition are made thinner at the edges than in the center, so as to provide for the lapping of the covering when wrapped around the pipes in spiral folds.

This covering is to be applied to water-pipes to prevent freezing, and may also be applied to steam-pipes, or in any other application where the transmission or radiation of heat is to be prevented.

Having thus described my invention, what I claim as new is—

The non-conducting covering consisting of felt, red flannel, Osnaburg cloth, and paper, with layers of composition Nos. 1 2 3 4 alternating therewith, as described, the said layers being composed of beeswax, rosin, tallow, charcoal, glycerine, salt, coal-tar, soap, and Cayenne pepper, substantially as shown and described.

JOSEPH L. STILLMAN.

Witnesses:
W. F. HILLS,
L. E. WALKER.